United States Patent
Ji et al.

(10) Patent No.: US 12,461,325 B2
(45) Date of Patent: Nov. 4, 2025

(54) OPTICAL MODULE

(71) Applicant: HISENSE BROADBAND MULTIMEDIA TECHNOLOGIES CO., LTD., Shandong (CN)

(72) Inventors: Jingqi Ji, Shandong (CN); Fabu Xu, Shandong (CN); Wei Cui, Shandong (CN)

(73) Assignee: HISENSE BROADBAND MULTIMEDIA TECHNOLOGIES CO., LTD., Qingdao (CN)

(*) Notice: Subject to any disclaimer, the term of this patent is extended or adjusted under 35 U.S.C. 154(b) by 264 days.

(21) Appl. No.: 18/344,684

(22) Filed: Jun. 29, 2023

(65) Prior Publication Data

US 2023/0341640 A1 Oct. 26, 2023

Related U.S. Application Data

(63) Continuation of application No. PCT/CN2021/134683, filed on Dec. 1, 2021.

(30) Foreign Application Priority Data

Feb. 8, 2021 (CN) .......................... 202110169770.9

(51) Int. Cl.
G02B 6/42 (2006.01)

(52) U.S. Cl.
CPC ........... *G02B 6/428* (2013.01); *G02B 6/4246* (2013.01)

(58) Field of Classification Search
CPC .............................. G02B 6/428; G02B 6/4281
See application file for complete search history.

(56) References Cited

U.S. PATENT DOCUMENTS

| | | | |
|---|---|---|---|
| 2005/0036746 A1* | 2/2005 | Scheibenreif | G02B 6/4201 385/92 |
| 2011/0103797 A1* | 5/2011 | Oki | G02B 6/4261 398/79 |

(Continued)

FOREIGN PATENT DOCUMENTS

| | | |
|---|---|---|
| CN | 103293607 A | 9/2013 |
| CN | 109061811 A | 12/2018 |

(Continued)

OTHER PUBLICATIONS

International Search Report and Written Opinion dated Feb. 23, 2022 in corresponding International Application No. PCT/CN2021/134683, translated, 20 pages.

(Continued)

*Primary Examiner* — Michael Stahl
(74) *Attorney, Agent, or Firm* — MH2 TECHNOLOGY LAW GROUP LLP

(57) ABSTRACT

An optical module includes a circuit board, an internal optical fiber, a first light transceiver component, a second light transceiver component, and a protective cover. The internal optical fiber includes a first optical fiber strip and a second optical fiber strip. The protective cover includes a first protective sub-cover and a second protective sub-cover. The first protective sub-cover covers the first light transceiver component and includes a first body, two rods, and two limiting structures. The two limiting structures are disposed on the two rods and configured to limit the first optical fiber strip and the second optical fiber strip. The second protective sub-cover covers the second light transceiver component and is connected to the first protective sub-cover. The second protective sub-cover is located between the two rods.

20 Claims, 8 Drawing Sheets

(56) References Cited

U.S. PATENT DOCUMENTS

| | | | |
|---|---|---|---|
| 2012/0237171 A1* | 9/2012 | Oki | G02B 6/4261 |
| | | | 385/92 |
| 2013/0230278 A1 | 9/2013 | Hung et al. | |
| 2014/0205248 A1 | 7/2014 | Yamada | |
| 2020/0249401 A1 | 8/2020 | Sipes, Jr. et al. | |
| 2020/0295528 A1 | 9/2020 | Du et al. | |
| 2024/0019650 A1* | 1/2024 | Zheng | G02B 6/4277 |

FOREIGN PATENT DOCUMENTS

| | | | |
|---|---|---|---|
| CN | 110388576 A | 10/2019 | |
| CN | 210090745 U | 2/2020 | |
| CN | 110888206 A | 3/2020 | |
| CN | 111338039 A | 6/2020 | |
| CN | 111352192 A | 6/2020 | |
| CN | 112051646 A | 12/2020 | |
| JP | 2013152424 A | 8/2013 | |
| WO | 2013039209 A1 | 3/2013 | |

OTHER PUBLICATIONS

Chinese First Office Action dated Nov. 30, 2022 in corresponding Chinese Application No. 202110169770.9, translated, 15 pages.

* cited by examiner

OPTICAL MODULE

CROSS-REFERENCE TO RELATED APPLICATIONS

This application is a continuation application of International Patent Application No. PCT/CN2021/134683, filed on Dec. 1, 2021, which claims priority to Chinese Patent Application No. 202110169770.9, filed on Feb. 8, 2021, which are incorporated herein by reference in their entireties.

TECHNICAL FIELD

The present disclosure relates to the field of optical communication technologies, and in particular, to an optical module.

BACKGROUND

In the optical communication technologies, an optical module is a tool for achieving interconversion between an optical signal and an electrical signal and is one of key elements in an optical communication equipment. Moreover, with the development of optical communication technologies, the interconversion between the optical signal and the electrical signal using silicon optical chips has become a common solution for high-speed optical modules.

SUMMARY

An optical module is provided. The optical module includes a circuit board, an internal optical fiber, a first light transceiver component, a second light transceiver component, and a protective cover. The internal optical fiber includes a first optical fiber strip and a second optical fiber strip. The first light transceiver component is disposed on the circuit board and electrically connected to the circuit board, and the second light transceiver component is disposed on the circuit board and electrically connected to the circuit board. The protective cover includes a first protective sub-cover and a second protective sub-cover. The first protective sub-cover covers the first light transceiver component, and the first protective sub-cover includes a first body, two rods, and two limiting structures. The two rods are disposed on an end of the first body proximate to the second light transceiver component and extend in a direction away from the first body, and the two rods are arranged at an interval and proximate to edges of two sides of the first body respectively. The two limiting structures are disposed on the two rods respectively, and the two limiting structures are configured to limit the first optical fiber strip and the second optical fiber strip. The first optical fiber strip and the second optical fiber strip are connected to the first light transceiver component through the two limiting structures respectively. The second protective sub-cover covers the second light transceiver component and is connected to the first protective sub-cover. The second protective sub-cover is located between the two rods.

BRIEF DESCRIPTION OF THE DRAWINGS

In order to describe the technical solutions in the present disclosure more clearly, accompanying drawings to be used in some embodiments of the present disclosure will be introduced briefly below. However, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams but are not limitations on an actual size of a product, an actual process of a method, and an actual timing of a signal involved in the embodiments of the present disclosure.

DETAILED DESCRIPTION

Figure 1:
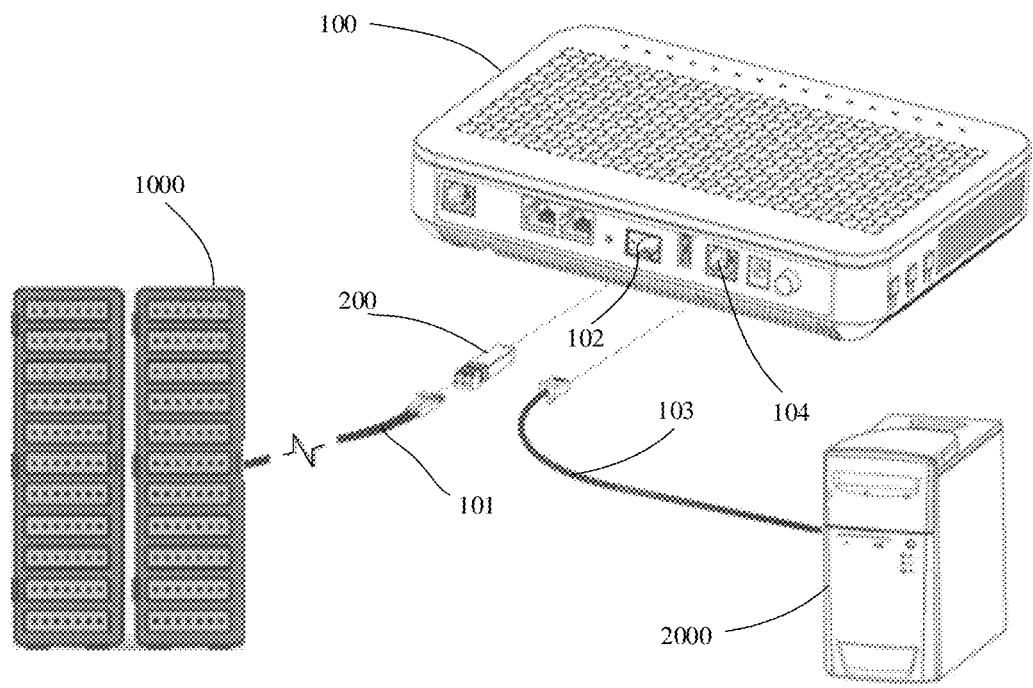
FIG. 1 is a diagram showing a partial structure of an optical communication system, in accordance with some embodiments.

Some embodiments of the present disclosure will be clearly and completely described below with reference to the accompanying drawings. However, the described embodiments are merely some but not all embodiments of the present disclosure. All other embodiments obtained by a person of ordinary skill in the art based on embodiments of the present disclosure shall be included in the protection scope of the present disclosure.

Unless the context requires otherwise, throughout the specification and the claims, the term "comprise" and other forms thereof such as the third-person singular form "comprises" and the present participle form "comprising" are construed as an open and inclusive meaning, i.e., "including, but not limited to." In the description of the specification, the terms such as "one embodiment," "some embodiments," "exemplary embodiments," "example," "specific example,"

or "some examples" are intended to indicate that specific features, structures, materials, or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

Hereinafter, the terms such as "first" and "second" are used for descriptive purposes only and are not to be construed as indicating or implying the relative importance or implicitly indicating the number of indicated technical features. Thus, features defined by "first" or "second" may explicitly or implicitly include one or more of the features. In the description of the embodiments of the present disclosure, the term "a plurality of" or "the plurality of" means two or more unless otherwise specified.

In the description of some embodiments, the term "connected," and the derivative thereof may be used. The term "connected" should be understood in a broad sense. For example, the term "connected" may represent a fixed connection, a detachable connection, or a one-piece connection, or may represent a direct connection, or may represent an indirect connection through an intermediate medium. The embodiments disclosed herein are not necessarily limited to the content herein.

The phrase "at least one of A, B, and C" has the same meaning as the phrase "at least one of A, B, or C", both including the following combinations of A, B, and C: only A, only B, only C, a combination of A and B, a combination of A and C, a combination of B and C, and a combination of A, B, and C.

The phrase "A and/or B" includes the following three combinations: only A, only B, and a combination of A and B.

The use of the phase "applicable to" or "configured to" herein means an open and inclusive expression, which does not exclude devices that are applicable to or configured to perform additional tasks or steps.

The term such as "about," "substantially," and "approximately" as used herein includes a stated value and an average value within an acceptable range of deviation of a particular value. The acceptable range of deviation is determined by a person of ordinary skill in the art, considering measurement in question and errors associated with measurement of a particular quantity (i.e., limitations of a measurement system).

The term such as "parallel," "perpendicular," or "equal" as used herein includes a stated condition and a condition similar to the stated condition. A range of the similar condition is within an acceptable deviation range, and the acceptable deviation range is determined by a person of ordinary skill in the art, considering measurement in question and errors associated with measurement of a particular quantity (i.e., the limitations of a measurement system).

In the description of the present disclosure, it may be understood that, orientations or positional relationships indicated by terms such as "central," "length," "width," "thickness," "up," "down," "front," "rear," "left," "right," "vertical," "horizontal," "top," "bottom," "inner," "outer," and the like are based on orientations or positional relationships shown in the drawings, which are merely to facilitate and simplify the description of the present disclosure, but are not to indicate or imply that the devices or elements referred to must have a particular orientation, or must be constructed or operated in a particular orientation. Therefore, these terms will not be construed as limitations of the present disclosure.

In the optical communication technology, in order to establish information transmission between information processing equipment, it is necessary to load information into the light and use the propagation of the light to achieve information transmission. Here, the light loaded with information is an optical signal. When the optical signal is transmitted in an information transmission equipment, the loss of optical power may be reduced, thus the high-speed, long-distance, and low-cost information transmission may be achieved. A signal that the information processing equipment can recognize and process is an electrical signal. The information processing equipment usually includes optical network units (ONU), gateways, routers, switches, mobile phones, computers, servers, tablet computers, and TVs. The information transmission equipment usually includes optical fibers and optical waveguides.

An optical module may achieve mutual conversion of optical signals and electrical signals between the information processing equipment and the information transmission equipment. For example, at least one of an optical signal input end or an optical signal output end of the optical module is connected to an optical fiber, and at least one of an electrical signal input end or an electrical signal output end of the optical module is connected to an optical network unit. A first optical signal from the optical fiber is transmitted to the optical module, and the optical module converts the first optical signal into a first electrical signal and transmits the first electrical signal to the optical network unit. A second electrical signal from the optical network unit is transmitted to the optical module, and the optical module converts the second electrical signal into a second optical signal and transmits the second optical signal to the optical fiber. Since information may be transmitted among a plurality of information processing equipment through electrical signals, at least one of the plurality of information processing equipment is required to be directly connected to the optical module, without all the information processing equipment being directly connected to the optical module. Here, the information processing equipment directly connected to the optical module is called a master monitor of the optical module. In addition, the optical signal input end or the optical signal output end of the optical module may be called an optical port, and the electrical signal input end or the electrical signal output end of the optical module may be called an electrical port.

FIG. 1 is a diagram showing a partial structure of an optical communication system, in accordance with some embodiments. As shown in FIG. 1, the optical communication system mainly includes a remote information processing device 1000, a local information processing device 2000, a master monitor 100, an optical module 200, an optical fiber 101, and a network cable 103.

One end of the optical fiber 101 extends toward the remote information processing device 1000, and the other end of the optical fiber 101 is connected to the optical module 200 through the optical port of the optical module 200. The optical signal may be totally reflected in the optical fiber 101, and the propagation of the optical signal in the direction of the total reflection may almost maintain an original optical power. The optical signal undergoes multiple total reflections in the optical fiber 101, so that the optical signal from the remote information processing device 1000 is transmitted to the optical module 200, or the optical signal from the optical module 200 is transmitted to the remote information processing device 1000, so as to achieve the information transmission with long-distance and low power consumption.

The optical communication system may include one or more optical fibers 101, and the optical fibers 101 are detachably connected to the optical module 200. Alternatively, the optical fibers 101 are fixedly connected to the optical module 200. The master monitor 100 is configured to provide data signals to the optical module 200, receive data signals from the optical module 200, or monitor or control the working status of the optical module 200.

The master monitor 100 includes a housing in a substantially cuboid shape, and an optical module interface 102 disposed in the housing. The optical module interface 102 is configured to connect to the optical module 200, so that one-way electrical signal connection or bidirectional electrical signal connection between the master monitor 100 and the optical module 200 is established.

The master monitor 100 also includes an external electrical interface, the external electrical interface may be connected to an electrical signal network. For example, the external electrical interface includes a universal serial bus (USB) interface or a network cable interface 104, and the network cable interface 104 is configured to connect to the network cable 103, so that the one-way electrical signal connection and the bidirectional electrical signal connection between the master monitor 100 and the network cable 103 are established. One end of the network cable 103 is connected to the local information processing device 2000, and the other end of the network cable 103 is connected to the master monitor 100, so as to establish an electrical signal connection between the local information processing device 2000 and the master monitor 100 through the network cable 103. For example, a third electrical signal sent by the local information processing device 2000 is transmitted to the master monitor 100 through the network cable 103, and the master monitor 100 generates a second electrical signal according to the third electrical signal; the second electrical signal from the master monitor 100 is transmitted to the optical module 200, the optical module 200 converts the second electrical signal into the second optical signal, and transmits the second optical signal to the optical fiber 101; and the second optical signal is transmitted to the remote information processing device 1000 in the optical fiber 101. For example, the first optical signal from the remote information processing device 1000 propagates through the optical fiber 101; the first optical signal from the optical fiber 101 is transmitted to the optical module 200; the optical module 200 converts the first optical signal into the first electrical signal and transmits the first electrical signal to the master monitor 100; and the master monitor 100 generates a fourth electrical signal according to the first electrical signal, and transmits the fourth electrical signal to the local information processing device 2000. It will be noted that, the optical module is a tool to achieve the mutual conversion of the optical signal and the electrical signal. During the conversion process of the above optical signal and electrical signal, the information does not change, and the encoding and decoding methods of information may change.

In addition to the optical network unit, the master monitor 100 further includes an optical line terminal (OLT), an optical network terminal (ONT), or a data center server.

Figure 2:
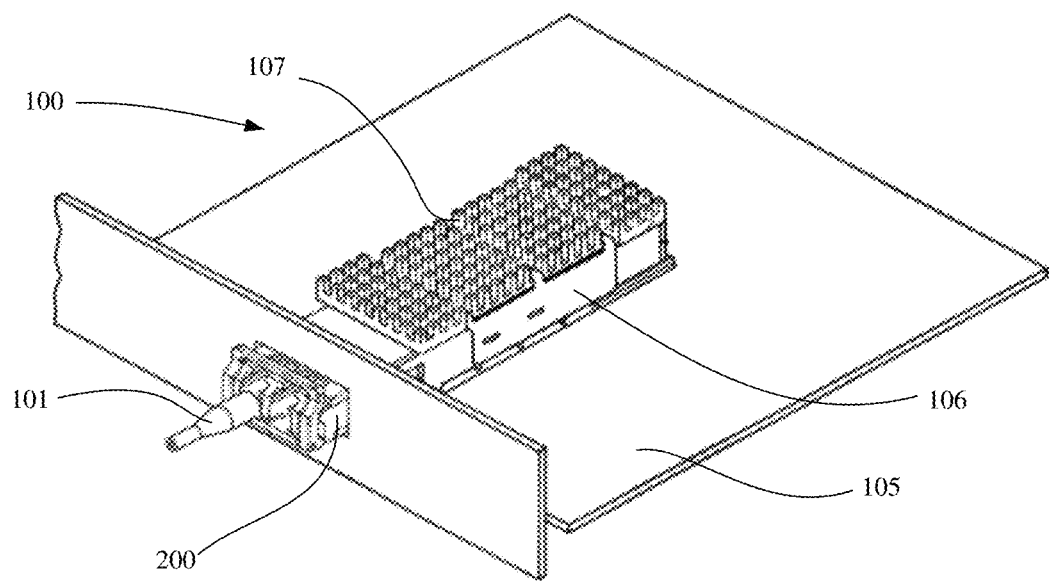
FIG. 2 is a diagram showing a local structure of a master monitor, in accordance with some embodiments.

FIG. 2 is a diagram showing a local structure of a master monitor, in accordance with some embodiments. In order to clearly show a connection relationship between the optical module 200 and the master monitor 100, FIG. 2 only shows structures of the master monitor 100 that are related to the optical module 200. As shown in FIG. 2, the master monitor 100 further includes a PCB circuit board 105 disposed in the housing, a cage 106 disposed on a surface of the PCB circuit board 105, a heat sink 107 disposed on the cage 106, and an electrical connector disposed inside the cage 106. The electrical connector is configured to connect the electrical port of the optical module 200, and the heat sink 107 has protruding structures such as fins for increasing a heat dissipation area.

The optical module 200 is inserted into the cage 106 of the master monitor 100, and the optical module 200 is fixed by the cage 106. Heat generated by the optical module 200 is conducted to the cage 106 and then is dissipated through the heat sink 107. After the optical module 200 is inserted into the cage 106, the electrical port of the optical module 200 is connected to the electrical connector inside the cage 106, so that the bidirectional electrical signal connection is established between the optical module 200 and the master monitor 100. In addition, the optical port of the optical module 200 is connected to the optical fiber 101, so that a bidirectional optical signal connection is established between the optical module 200 and the optical fiber 101. Here, the optical fiber 101 may also be referred to as an external optical fiber.

Figure 3:
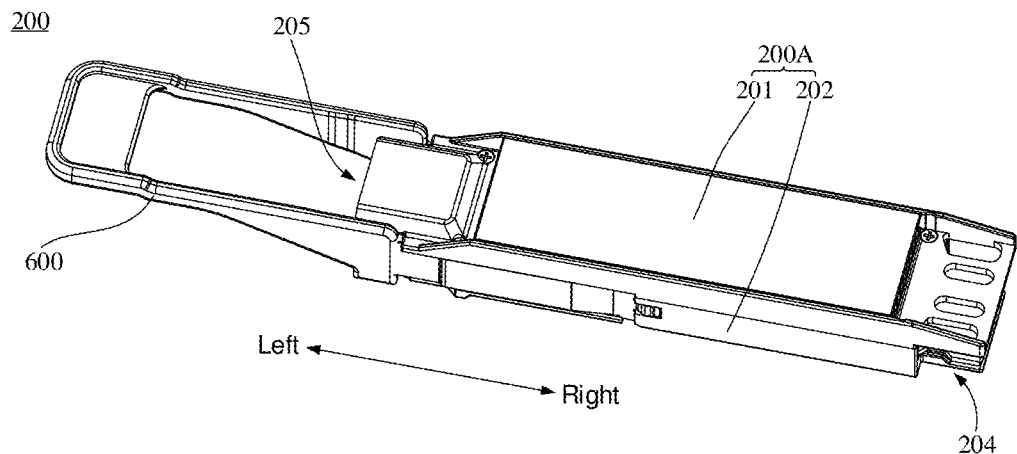
FIG. 3 is a diagram showing a structure of an optical module, in accordance with some embodiments.
Figure 4:
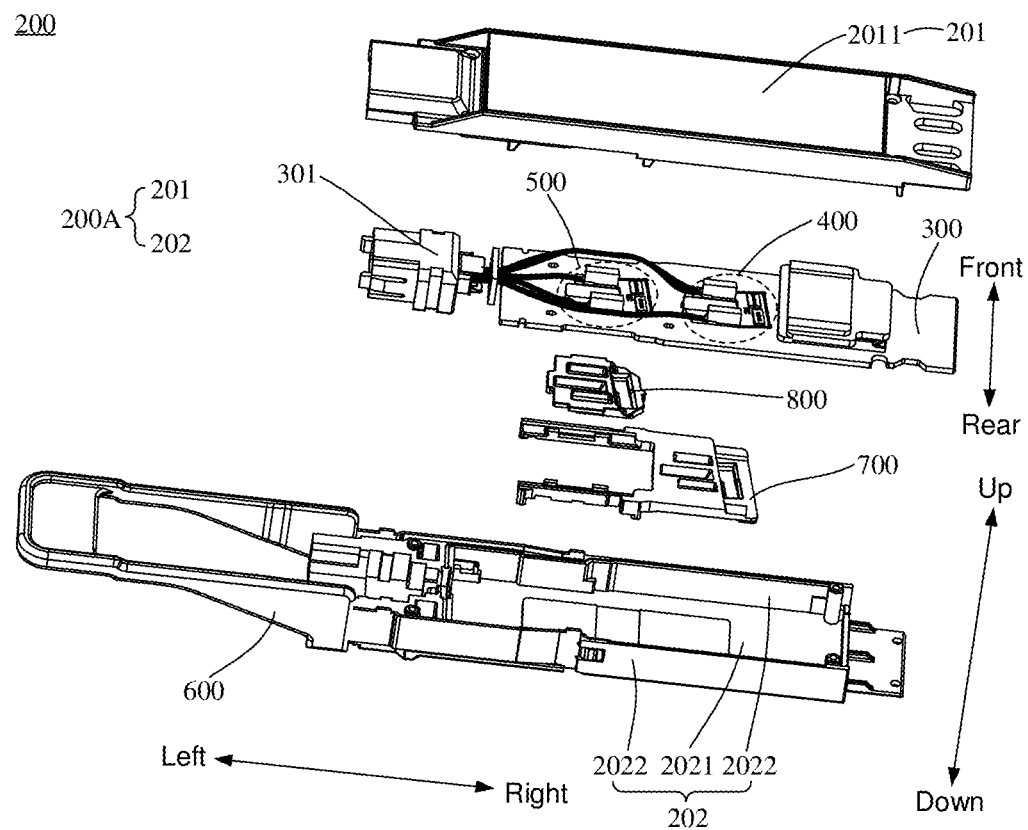
FIG. 4 is an exploded view of an optical module, in accordance with some embodiments.

FIG. 3 is a diagram showing a structure of an optical module, in accordance with some embodiments. FIG. 4 is an exploded view of an optical module, in accordance with some embodiments. As shown in FIGS. 3 and 4, the optical module 200 includes a shell 200A, a circuit board 300, and a plurality of light transceiver components that are disposed inside the shell 200A. For example, the optical module 200 includes a first light transceiver component 400 and a second light transceiver component 500. However, the present disclosure is not limited thereto. In some embodiments, the optical module 200 may also include one, three, or more light transceiver components.

The shell 200A includes an upper shell 201 and a lower shell 202. The upper shell 201 is covered on the lower shell 202, so as to form the shell 200A having two openings 204 and 205, and an outer contour of the shell 200A is generally in a cuboid shape.

In some embodiments, the lower shell 202 includes a bottom plate 2021 and two lower side plates 2022 located on both sides of the bottom plate 2021, respectively, and disposed perpendicular to the bottom plate 2021. The upper shell 201 includes a cover plate 2011, and the cover plate 2011 covers the two lower side plates 2022, so as to form the shell 200A.

In some embodiments, the lower shell 202 includes a bottom plate 2021 and two lower side plates 2022 located on both sides of the bottom plate 2021, respectively, and disposed perpendicular to the bottom plate 2021. The upper shell 201 includes a cover plate 2011 and two upper side plates located on both sides of the cover plate 2011, respectively, and disposed perpendicular to the cover plate 2011. The two upper side plates are combined with the two lower side plates 2022, respectively, so that the upper shell 201 covers the lower shell 202.

A direction in which a connecting line between two openings 204 and 205 is located may be the same as a longitudinal direction of the optical module 200 or may not be the same as the longitudinal direction of the optical module 200. For example, the opening 204 is located at an end (e.g., the right end in FIG. 3) of the optical module 200, and the opening 205 is also located at an end (e.g., the left end in FIG. 3) of the optical module 200. Alternatively, the opening 204 is located at an end of the optical module 200, and the opening 205 is located at a side of the optical module 200. The opening 204 is the electrical port, and a connecting finger of the circuit board 300 extends from the electrical port 204 and is inserted into the electrical connector of the master monitor 100. The opening 205 is the optical port, and the opening 205 is configured to connect to the external optical fiber 101, so that the optical fiber 101 is connected to the light transceiver component.

By using an assembly manner of combining the upper shell 201 with the lower shell 202, it is possible to facilitate installation of the circuit board 300, the first light transceiver component 400, and the second light transceiver component 500 into the shell 200A, and the upper shell 201 and the lower shell 202 may form encapsulation and protection for these components. In addition, when the circuit board 300, the first light transceiver component 400, and the second light transceiver component 500 are assembled, it is possible to facilitate arrangement of positioning assemblies, heat dissipation assemblies, and electromagnetic shielding assemblies of these components, which is conducive to implementation of automated production.

In some embodiments, the upper shell 201 and the lower shell 202 are made of a metal material, which is conducive to electromagnetic shielding and heat dissipation.

In some embodiments, as shown in FIGS. 3 and 4, the optical module 200 further includes an unlocking component 600 located outside the shell 200A thereof. The unlocking component 600 is configured to implement a fixed connection between the optical module 200 and the master monitor 100 or to release a fixed connection between the optical module 200 and the master monitor 100.

For example, the unlocking component 600 is located outside the two lower side plates 2022 of the lower shell 202 and includes an engagement portion that is matched with the cage 106 of the master monitor 100. When the optical module 200 is inserted into the cage 106, the optical module 200 is fixed in the cage 106 by the engagement portion of the unlocking component 600. When the unlocking component 600 is pulled, the engagement portion of the unlocking component 600 moves along with the unlocking component 600, and then a connection relationship between the engagement portion and the master monitor 100 is changed, so as to release the fixing between the optical module 200 and the master monitor, so that the optical module 200 may be pulled out of the cage 106.

The circuit board 300 includes circuit wirings, electronic elements, and chips, and the electronic element and the chip are connected according to a circuit design through the circuit wirings, so as to implement functions such as power supply, transmission of the electrical signal, and grounding. The electronic element includes, for example, a capacitor, a resistor, a triode, and a metal-oxide-semiconductor field-effect transistor (MOSFET). The chips include, for example, a microcontroller unit (MCU), a laser driving chip, a transimpedance amplifier (TIA), a limiting amplifier, a clock and data recovery (CDR) chip, a power management chip, or a digital signal processing (DSP) chip.

The circuit board 300 is generally a rigid circuit board. Due to the relatively hard material of the rigid circuit board, the rigid circuit board may also achieve bearing effects. For example, the rigid circuit board may stably bear the electronic elements and the chips, and the rigid circuit board may also be inserted into the electrical connector in the cage 106 of the master monitor 100.

The circuit board 300 further includes the connecting finger formed on an end surface thereof, and the connecting finger is composed of a plurality of independent pins. The circuit board 300 is inserted into the cage 106, and the circuit board 300 is conducted with the electrical connector in the cage 106 through the connecting finger. The connecting finger may be disposed on one surface (e.g., an upper surface shown in FIG. 4) of the circuit board 300. Alternatively, the connecting finger may also be disposed on both upper and lower surfaces of the circuit board 300 to provide a larger number of pins, so as to adapt to an occasion where a large number of pins are needed. The connecting finger is configured to establish an electrical connection with the master monitor 100, so as to implement power supply, grounding, inter-integrated circuit (I2C) signal transmission, and data signal transmission. Of course, flexible circuit boards are also used in some optical modules. The flexible circuit board is generally used in conjunction with the rigid circuit board as a supplement to the rigid circuit board.

In some embodiments, the first light transceiver component 400 and the second light transceiver component 500 may be disposed on a same side of the circuit board 300 in a thickness direction of the circuit board 300. Alternatively, the first light transceiver component 400 and the second light transceiver component 500 may also be disposed on two sides of the circuit board 300 in the thickness direction of the circuit board 300, respectively.

Figure 5:
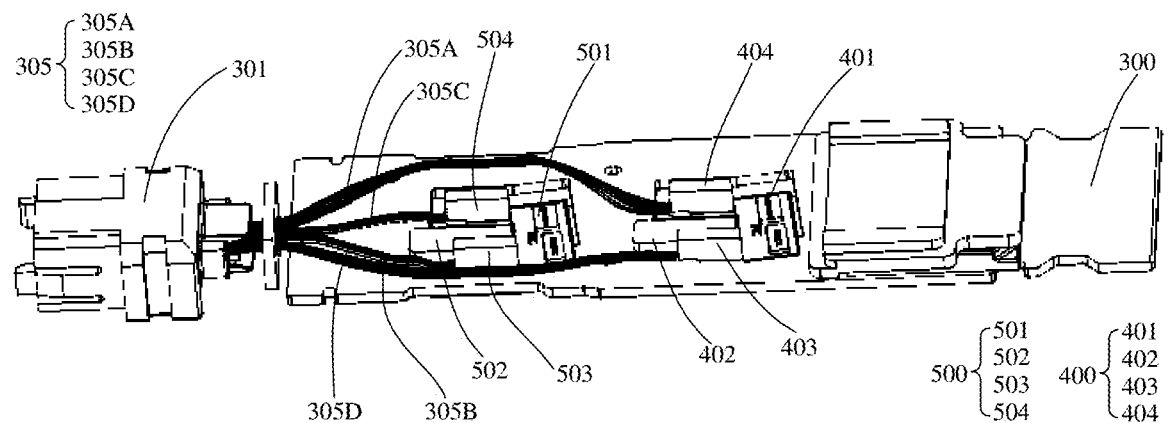
FIG. 5 is a diagram showing a partial structure of an optical module, in accordance with some embodiments.

FIG. 5 is a diagram showing a partial structure of an optical module, in accordance with some embodiments. FIG. 5 shows an assembly relationship between components on the circuit board 300.

In some embodiments, as shown in FIG. 5, the first light transceiver component 400 and the second light transceiver component 500 are disposed on the circuit board 300. The first light transceiver component 400 includes a first silicon optical chip 401, a first laser assembly 402, a first optical fiber connector 403, and a second optical fiber connector 404. The second light transceiver component 500 includes a second silicon optical chip 501, a second laser assembly 502, a third optical fiber connector 503, and a fourth optical fiber connector 504.

In this case, the optical module 200 further includes a plurality of internal optical fibers 305 and an optical fiber interface 301. The plurality of internal optical fibers 305 form a plurality of optical fiber strips. An end of a corresponding optical fiber strip of the plurality of optical fiber strips is connected to a corresponding optical fiber connector (e.g., the first optical fiber connector 403, the second optical fiber connector 404, the third optical fiber connector 503, or the fourth optical fiber connector 504), and another end of the corresponding optical fiber strip of the plurality of optical fiber strips is connected to the optical fiber interface 301. The optical fiber interface 301 is connected to the external optical fiber 101, and the plurality of optical fiber connectors each are connected to the corresponding silicon optical chip (e.g., the first silicon optical chip 401 or the second silicon optical chip 502).

For example, the plurality of optical fiber strips include a first optical fiber strip 305A, a second optical fiber strip 305B, a third optical fiber strip 305C, and a fourth optical fiber strip 305D. An end of the first optical fiber strip 305A is connected to the optical fiber interface 301, and another end of the first optical fiber strip 305A is connected to the second optical fiber connector 404. An end of the second optical fiber strip 305B is connected to the optical fiber interface 301, and another end of the second optical fiber strip 305B is connected to the first optical fiber connector 403. An end of the third optical fiber strip 305C is connected to the optical fiber interface 301, and another end of the third optical fiber strip 305C is connected to the fourth optical fiber connector 504. An end of the fourth optical fiber strip 305D is connected to the optical fiber interface 301, and another end of the fourth optical fiber strip 305D is connected to the third optical fiber connector 503.

Figure 6:
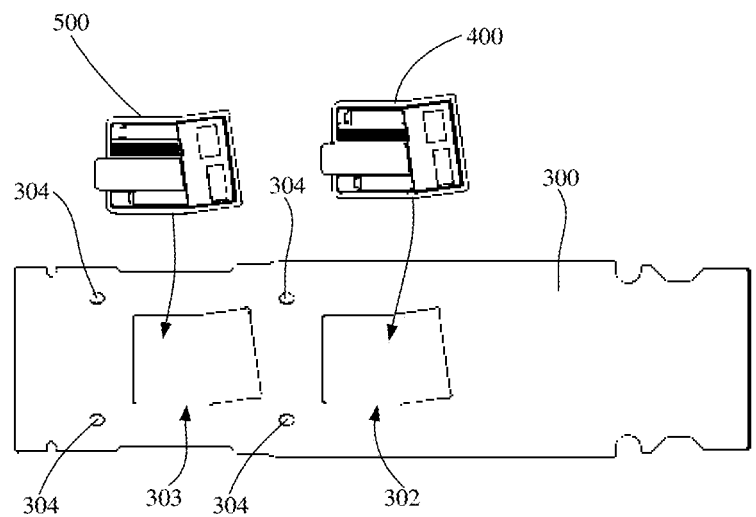
FIG. 6 is an exploded view of a circuit board, a first light transceiver component, and a second light transceiver component, in accordance with some embodiments.

FIG. 6 is an exploded view of a circuit board, a first light transceiver component, and a second light transceiver component, in accordance with some embodiments.

In some embodiments, as shown in FIG. 6, the optical module 200 further includes a first opening 302 and a second opening 303. The first opening 302 and the second opening 303 run through the circuit board 300 in a thickness direction (e.g., the up-down direction in FIG. 4) of the circuit board 300. The first light transceiver component 400 is disposed in the first opening 302, and the second light transceiver component 500 is disposed in the second opening 303.

For example, the first silicon optical chip 401, the first laser assembly 402, the first optical fiber connector 403, and the second optical fiber connector 404 are located in the first opening 302. The second silicon optical chip 501, the second laser assembly 502, the third optical fiber connector 503, and the fourth optical fiber connector 504 are located in the second opening 303. In this way, it is conducive to conducting the heat generated by the light transceiver components to the lower shell 202, and the lower shell 202 releases the heat to the outside, so that the light transceiver components may work normally.

As integration of the optical module 200 increases, a power density of the optical module 200 increases continuously, so that the optical module 200 generates a large amount of heat inside the optical module 200 during operation. In some embodiments of the present disclosure, the first light transceiver component 400 and the second light transceiver component 500 may be disposed in the first opening 302 and the second opening 303 respectively. In this way, the first light transceiver component 400 and the second light transceiver component 500 may be directly fixed on the lower shell 202, which reduces barriers between the first light transceiver component 400 and the lower shell 202, and the second light transceiver component 500 and the lower shell 202, so as to facilitate the dissipation of heat generated by the first light transceiver component 400 and the second light transceiver component 500 in a timely manner, and avoid affecting the working performance of the optical module 200.

A working principle of the light transceiver component will be described below according to the first light transceiver component 400.

Figure 7:
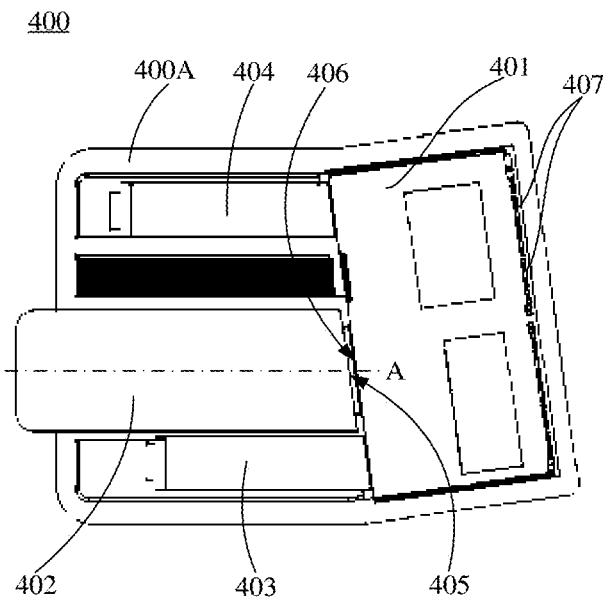
FIG. 7 is a diagram showing a structure of a first light transceiver component, in accordance with some embodiments.

FIG. 7 is a diagram showing a structure of a first light transceiver component, in accordance with some embodiments.

In some embodiments, as shown in FIG. 7, the first light transceiver component 400 further includes a base 400A. The first laser assembly 402 is disposed on the base 400A and is configured to emit light. The light emitted by the first laser assembly 402 enters the first silicon optical chip 401 through a surface (e.g., the light-exit surface 405 in FIG. 7) of the first laser assembly 402 proximate to the first silicon optical chip 401. Since the first silicon optical chip 401 uses silicon as the main material, and silicon is not the ideal light-emitting material, a light source may not be integrated into the first silicon optical chip 401, and the first laser assembly 402 serves as the light source to provide light. The first laser assembly 402 emits the light without carrying information to the first silicon optical chip 401.

The first silicon optical chip 401 is disposed on the base 400A, and is configured to modulate the light emitted by the first laser assembly 402 to load information into the light and receive and demodulate the optical signal from the outside. The light from the first laser assembly 402 enters the first silicon optical chip 401 through a surface (e.g., the optical coupling surface 406 in FIG. 7) of the first silicon optical chip 401 proximate to the first laser assembly 402 and carries information as the optical signal after being modulated by the first silicon optical chip 401. A surface of the first silicon optical chip 401 is provided with pads 407 electrically connected to the circuit board 300 through wire bonding, so that the first silicon optical chip 401 may be electrically connected to the circuit board 300.

In some embodiments of the present disclosure, the circuit board 300 provides data signal from the master monitor 100 to the first silicon optical chip 401, and the first silicon optical chip 401 modulates the data signal into the light from the first laser assembly 402, so as to form an optical signal. The external optical signal is demodulated by the first silicon optical chip 401 into an electrical signal, and then the electrical signal is transmitted to the master monitor 100 through the circuit board 300.

In some embodiments, a Mach-Zehnder modulator is disposed in the first silicon optical chip 401, so as to achieve the modulation of the optical signal by the Mach-Zehnder modulator.

For example, the Mach-Zehnder modulator adopts the principle of interference of light of a same wavelength. One Mach-Zehnder modulator is provided with two optical channels. Due to the fact that only one beam of light is transmitted in a single optical channel, it is necessary to provide two beams of light of a same wavelength to the Mach-Zehnder modulator. In this case, the light source (e.g., the first laser assembly 402) may provide a beam of light of a single wavelength to the silicon optical chip (e.g., the first silicon optical chip 401), and the single beam of light is divided into two beams of light of a same wavelength by an optical waveguide inside the silicon optical chip, so that the two beams of light of a same wavelength may be input into the two optical channels of the Mach-Zehnder modulator respectively. Alternatively, the light source may also provide two beams of light of a same wavelength to the silicon optical chip, and the two beams of light are directly incident into the two optical channels of the Mach-Zehnder modulator respectively. A phase difference of the two beams of light in the two optical channels will change with a change of the external electrical signal. When the two beams of light are merged together through interference, an intensity of the merged light will change with the change of the external electrical signal, which is equivalent to converting the change of the electrical signal into the change of the optical signal, so as to achieve the modulation of light. In this way, after being modulated by the Mach-Zehnder modulator, the light in the two optical channels is merged into a beam of the optical signal.

Since the Mach-Zehnder modulator may merge the light in the optical channels, in a case of using a single chip with a same optical power, compared with a solution where the light source provides a beam of light to the silicon optical chip, the solution where the light source provides two beams of light to the silicon optical chip may provide higher optical power.

The first silicon optical chip 401 is in optical coupling with the first optical fiber connector 403 and the second optical fiber connector 404. An end of the first optical fiber connector 403 is in optical coupling with the first silicon optical chip 401, and the other end of the first optical fiber connector 403 is connected to the second optical fiber strip 305B. An end of the second optical fiber connector 404 is in optical coupling with the first silicon optical chip 401, and the other end of the second optical fiber connector 404 is connected to the first optical fiber strip 305A. Here, the optical coupling refers to a phenomenon that two or more optical path elements have a mutual cooperation relationship, and light is transmitted from one optical path element to another optical path element. In this way, the first optical fiber connector 403 may transmit the optical signal emitted by the first silicon optical chip 401 to the optical fiber interface 301, and the second optical fiber connector 404 may transmit the optical signal from the optical fiber interface 301 into the first silicon optical chip 401.

For example, the optical coupling surface 406 of the first silicon optical chip 401 is provided with a first optical hole, a second optical hole, and a third optical hole, and the optical hole may have a plurality of optical channels. The first optical hole is in optical coupling with the first optical fiber connector 403. The second optical hole is in optical coupling with the first laser assembly 402, and a plurality of optical channels for receiving light of a same wavelength are disposed in the second optical hole. The third optical hole is in optical coupling with the second optical fiber connector 404.

It will be noted that, some embodiments of the present disclosure are described by considering an example in which one silicon optical chip is in optical coupling with two optical fiber connectors, however, the present disclosure is not limited thereto. In some embodiments, one silicon optical chip may also be in optical coupling with one, three, or more optical fiber connectors.

There is an optical connection between the first silicon optical chip 401 and the first laser assembly 402, and an optical path between the first silicon optical chip 401 and the first laser assembly 402 is very sensitive to a position relationship between the first silicon optical chip 401 and the first laser assembly 402. Moreover, materials with different expansion coefficients have different deformations, which is easy to affect the optical path between the first silicon optical chip 401 and the first laser assembly 402.

Therefore, in order to solve the above problem, in some embodiments of the present disclosure, the first silicon optical chip 401 and the first laser assembly 402 are disposed on a same base 400A. In this way, when the base 400A of a same material is deformed, the deformation has a same impact on positions of the first silicon optical chip 401 and the first laser assembly 402, so as to avoid a big change in the relative position between the first silicon optical chip 401 and the first laser assembly 402. Moreover, an expansion coefficient of the material of the base 400A may be substantially the same as that of at least one of the material of the first silicon optical chip 401 or the material of the first laser assembly 402. For example, the base 400A is usually made of silicon or glass, the first silicon optical chip 401 is mainly made of silicon, and the first laser assembly 402 may be made of kovar alloy. Here, the kovar alloy may be referred to as an iron-nickel-cobalt alloy or an iron-nickel-cobalt-glass sealing alloy.

In some embodiments, the first optical fiber connector 403, the second optical fiber connector 404, and the first laser assembly 402 are located on a same side of the first silicon optical chip 401. Moreover, the first optical fiber strip 305A and the second optical fiber strip 305B may be located on a same side of the circuit board 300. An axial direction A (e.g., the dash-dotted line as shown in FIG. 7) of the first laser assembly 402 is not perpendicular to the optical coupling surface 406 of the first silicon optical chip 401. In this case, the first silicon optical chip 401 may be arranged inclined relative to the first laser assembly 402, and the light-exit surface 405 of the first laser assembly 402 is constructed as an inclined surface and is inclined relative to a plane perpendicular to the axial direction A. In addition, surfaces of the first optical fiber connector 403 and the second optical fiber connector 404 in optical coupling with the first silicon optical chip 401 each are inclined surfaces. Of course, in some embodiments, the optical coupling surface 406 of the first silicon optical chip 401 may also be perpendicular to the axial direction A of the first laser assembly 402.

In some embodiments, the optical coupling surface 406 of the first silicon optical chip 401 in optical coupling with the first laser assembly 402, the first optical fiber connector 403, and the second optical fiber connector 404 is a plane, and the optical coupling surface 406 is parallel to the light-exit surface 405 of the first laser assembly 402.

Structures of the second silicon optical chip 501, the second laser assembly 502, the third optical fiber connector 503, and the fourth optical fiber connector 504 in the second light transceiver component 500 and their connection relationship are similar to those of the first light transceiver component 400, and details will not be repeated herein. Here, the second light transceiver component 500 is similar to the first light transceiver component 400, which may be understood that the two have a same conception, but the specific structures may be different from each other. For ease of description, the base 400A of the first light transceiver component 400 may be referred to as a first base, and a base of the second light transceiver component 500 may be referred to as a second base.

It will be noted that the first light transceiver component 400 and the second light transceiver component 500 each may achieve the transmission of an 800G (a signal transmission rate is 800 Gbit/s) optical module, of course, the present disclosure is not limited to the two light transceiver components.

The more light transceiver components, the more the corresponding internal optical fibers, and the more difficult it is to arrange and limit the internal optical fibers in the limited space of the circuit board 300. Moreover, it is necessary for the silicon optical chip to be electrically connected to the circuit board 300 by means of a large number of dense bonding wires (e.g., gold wires), and it is also necessary to protect these bonding wires. Therefore, it is necessary to consider the bundling of the internal optical fibers 305 and the protection of the bonding wires in the limited space of the circuit board 300.

Figure 8:
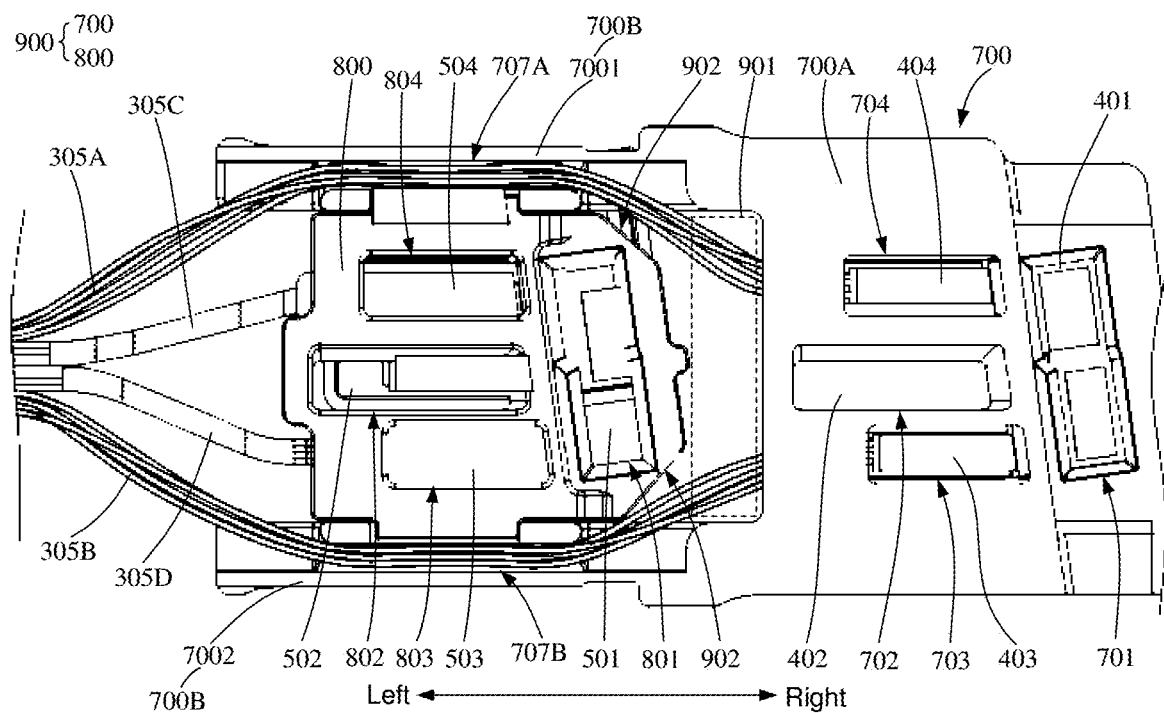
FIG. 8 is a diagram showing a structure of a protective cover, in accordance with some embodiments.

FIG. 8 is a diagram showing a structure of a protective cover, in accordance with some embodiments. FIG. 8 shows an assembly structure among a protective cover 900, the first light transceiver component 400, the second light transceiver component 500, and the internal optical fibers 305.

In order to solve the above problem, in some embodiments, as shown in FIG. 8, the optical module 200 further includes a protective cover 900, the protective cover 900 covers the first light transceiver component 400 and the second light transceiver component 500, so as to protect wire bonding regions corresponding to the first light transceiver component 400 and the second light transceiver component 500 and to limit the internal optical fibers 305. Here, the wire bonding region may refer to a region where bonding wires for the electrical connection between one of the first light transceiver component 400 and the second light transceiver component 500 and the circuit board 300 are located. The wire bonding region corresponding to the first light transceiver component 400 is the first wire bonding region; and the wire bonding region corresponding to the second light transceiver component 500 is the second wire bonding region.

In some embodiments, the protective cover 900 is a one-piece member. For example, as shown in FIG. 8, the protective cover 900 includes a first protective sub-cover 700 and a second protective sub-cover 800. The first protective sub-cover 700 is connected to the second protective sub-cover 800. A position of the first protective sub-cover 700 corresponds to a position of the first light transceiver component 400, and the first protective sub-cover 700 covers the first light transceiver component 400 and the first wire bonding region of the first light transceiver component 400. A position of the second protective sub-cover 800 corresponds to a position of the second light transceiver component 500, and the second protective sub-cover 800 covers the second light transceiver component 500 and the second wire bonding region of the second light transceiver component 500.

It will be noted that the present disclosure is not limited to the two light transceiver components and the two protective sub-covers, in some embodiments, the protective cover 900 may also include three, four, or more protective sub-covers, so as to correspond to three, four, or more light transceiver components.

In some embodiments, as shown in FIG. 8, a hollow region 901 (e.g., the dotted box in FIG. 8) is disposed between the first protective sub-cover 700 and the second protective sub-cover 800. The optical fiber strips (e.g., the first optical fiber strip 305A and the second optical fiber strip 305B) connected to the first light transceiver component 400 may extend from a side of the second protective sub-cover 800 away from the circuit board 300 to a side of the first protective sub-cover 700 proximate to the circuit board 300 through the hollow region 901, so as to be connected with the first light transceiver component 400. In this way, by providing the hollow region 901, it is conducive to the reasonable wiring and layout of the internal optical fibers 305 corresponding to the light transceiver components in the limited space of circuit board 300.

In some embodiments, as shown in FIG. 8, the first protective sub-cover 700 includes a first body 700A and two rods 700B (i.e., a first rod 7001 and a second rod 7002). The two rods 700B are disposed on an end (e.g., the left end) of the first body 700A proximate to the second light transceiver component 500 and extend in a direction away from the first body 700A. Moreover, the two rods 700B are arranged at an interval and are proximate to edges of two sides of the first body 700A, respectively. Here, the two sides of the first body 700A may refer to two sides of the first body 700A in a width direction of the circuit board 300. For example, the rods each may be an arm.

In this case, the second protective sub-cover 800 is disposed between the two rods 700B.

In some embodiments, as shown in FIG. 8, the first protective sub-cover 700 further includes two limiting structures (i.e., a first limiting structure 707A and a second limiting structure 707B). The first limiting structure 707A and the second limiting structure 707B are disposed on the two rods 700B, respectively. The first limiting structure 707A is located on a side of the first mounting portion 705 away from the second protective sub-cover 800, and the second limiting structure 707B is located on a side of the second mounting portion 706 away from the second protective sub-cover 800. The first limiting structure 707A and the second limiting structure 707B are configured to bundle and limit the optical fiber strips, so that the two light transceiver components may have the reasonable wiring and layout in the limited space of the circuit board 300. The first optical fiber strip 305A and the second optical fiber strip 305B may pass through the first limiting structure 707A and the second limiting structure 707B, respectively. For example, the first limiting structure 707A is disposed on the first rod 7001 and is located on a side of the second light transceiver component 500; and the second limiting structure 707B is disposed on the second rod 7002 and is located on the other side of the second light transceiver component 500. In this way, as shown in FIG. 8, the first optical fiber strip 305A and the second optical fiber strip 305B pass through the first limiting structure 707A and the second limiting structure 707B on two sides of the second protective sub-cover 800 (or the second light transceiver component 500) proximate to the two rods 700B, respectively. It will be noted that, the two sides of the second protective sub-cover 800 may refer to two sides of the second protective sub-cover 800 in the width direction (e.g., the front-rear direction in FIG. 4) of the circuit board 300.

In some embodiments, as shown in FIG. 8, the first limiting structure 707A and the second limiting structure 707B each are grooves. The groove is located on a side of the corresponding rod 700B away from the circuit board 300 and is recessed toward the circuit board 300. In this case, the first optical fiber strip 305A and the second optical fiber strip 305B each may be disposed in the corresponding groove.

In some embodiments, as shown in FIG. 8, a portion of a side of the second protective sub-cover 800 proximate to the first light transceiver component 400 may be an inclined surface 902, and the inclined surface 902 is inclined in a direction away from the first light transceiver component 400, so as to avoid the optical fiber strips (e.g., the first optical fiber strip 305A and the second optical fiber strip 305B) passing through the two sides of the second protective sub-cover 800. For example, as shown in FIG. 8, edges of the side of the second protective sub-cover 800 proximate to the first light transceiver component 400 each are inclined surfaces 902.

Figure 9:
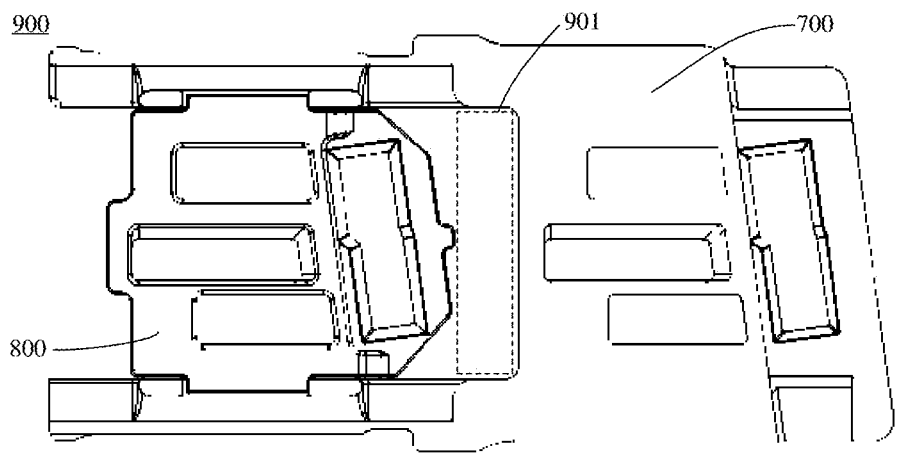
FIG. 9 is a diagram showing structures of a first protective sub-cover and a second protective sub-cover, in accordance with some embodiments.
Figure 10:
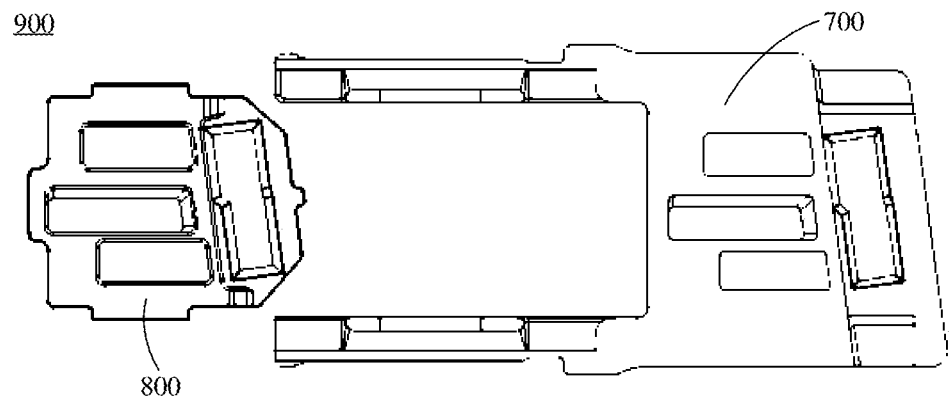
FIG. 10 is an exploded view of the first protective sub-cover and the second protective sub-cover in FIG. 9.

FIG. 9 is a diagram showing structures of a first protective sub-cover and a second protective sub-cover, in accordance with some embodiments. FIG. 9 shows an assembly structure between the first protective sub-cover 700 and the second protective sub-cover 800. FIG. 10 is an exploded view of the first protective sub-cover and the second protective sub-cover in FIG. 9.

The above description is mainly given by considering an example in which the protective cover 900 is the one-piece member. Of course, in some embodiments, the protective cover 900 may also be separate pieces.

For example, as shown in FIGS. 9 and 10, the protective cover 900 includes a first protective sub-cover 700 and a second protective sub-cover 800. The second protective sub-cover 800 is connected to the first protective sub-cover 700, and the first protective sub-cover 700 and the second protective sub-cover 800 each covers the circuit board 300, so as to protect the wire bonding regions corresponding to the first light transceiver component 400 and the second light transceiver component, and limit the internal optical fibers 305. Here, the first protective sub-cover 700 and the second protective sub-cover 800 are two independent structures, so as to be conducive to encapsulation and reducing the space occupied by the protective cover 900 on the circuit board 300.

It will be noted that, the present disclosure is not limited to the two light transceiver components and two protective sub-covers, and the protective cover 900 of the optical module 200 may also include three, four, or more protective sub-covers.

As shown in FIGS. 9 and 10, a position of the first body 700A of the first protective sub-cover 700 corresponds to the position of the first light transceiver component 400, and the first protective sub-cover 700 covers the first light transceiver component 400 and the first wire bonding region of the first light transceiver component 400. The position of the second protective sub-cover 800 corresponds to the position of the second light transceiver component 500, and the second protective sub-cover 800 covers the second light transceiver component 500 and the second wire bonding region of the second light transceiver component 500. Here, the structure of the first body 700A will be described later.

In some embodiments, the second protective sub-cover 800 is detachably connected to (e.g., clamped with) the first protective sub-cover 700. As shown in FIGS. 9 and 10, by the cooperation of the first protective sub-cover 700 and the second protective sub-cover 800, it is possible to satisfy the requirement of protecting a wire bonding region of an optical module with a high transmission rate.

The first protective sub-cover 700 and the second protective sub-cover 800 may be applicable to optical modules 200 of various structures. For example, in a case where the optical module 200 includes two light transceiver components, the protective cover 900 includes the first protective sub-cover 700 and the second protective sub-cover 800, so that the first protective sub-cover 700 and the second protective sub-cover 800 may cover the corresponding wiring bonding region of the two light transceiver components.

Alternatively, in a case where the optical module 200 is an optical module with a high transmission rate, and the optical module 200 includes three or more light transceiver components, the protective cover 900 includes three or more protective sub-covers.

The first protective sub-cover 700 and the second protective sub-cover 800 in some embodiments of the present disclosure will be described in detail below by considering an example in which the first protective sub-cover 700 and the second protective sub-cover 800 are the separate pieces.

Figure 11:
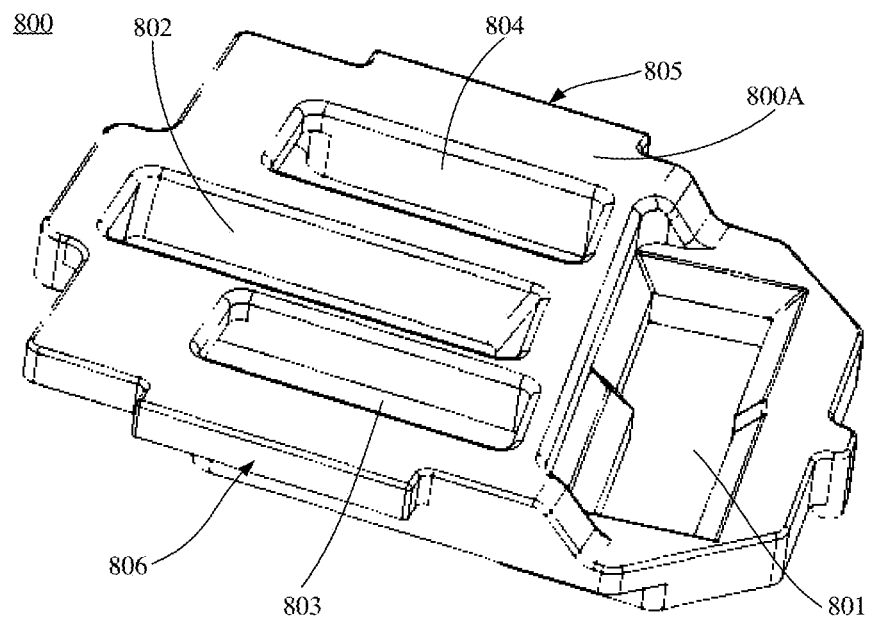
FIG. 11 is a diagram showing a structure of a second protective sub-cover, in accordance with some embodiments.
Figure 12:
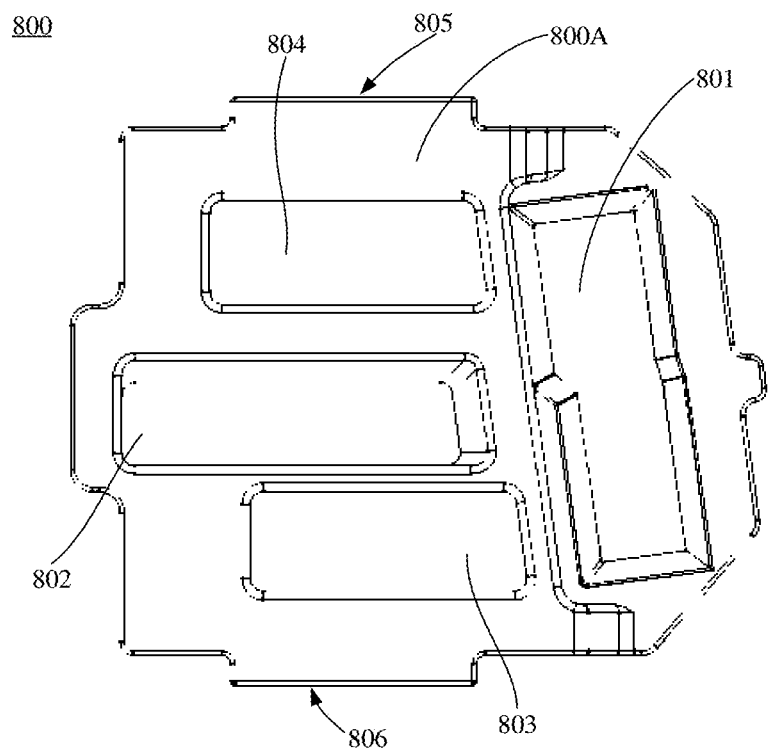
FIG. 12 is a top view of the second protective sub-cover in FIG. 11.

FIG. 11 is a diagram showing a structure of a second protective sub-cover, in accordance with some embodiments. FIG. 12 is a top view of the second protective sub-cover in FIG. 11. As shown in FIGS. 11 and 12, the second protective sub-cover 800 includes a second body 800A and a plurality of through holes, and the plurality of through holes run through the second body 800A in a thickness direction of the second body 800A. For example, the second protective sub-cover 800 includes a third through hole 801 and a fourth through hole 802. The third through hole 801 and the fourth through hole 802 are disposed on the second body 800A, so as to expose the second silicon optical chip 501 and the second laser assembly 502, thereby preventing the heat generated during the operation of the second silicon optical chip 501 and the second laser assembly 502 from accumulating in the second protective sub-cover 800.

Moreover, a side of the upper shell 201 proximate to the circuit board 300 may be provided with a plurality of heat dissipation structures, and a second portion of the plurality of heat dissipation structures may pass through the third through hole 801 and the fourth through hole 802, so as to contact thermal conductive adhesive on the second silicon optical chip 501 and the second laser assembly 502, so that the heat generated during the operation of the second silicon optical chip 501 and the second laser assembly 502 may be dissipated by the shell 200A, thereby achieving the heat dissipation of the second silicon optical chip 501 and the second laser assembly 502.

In some embodiments, as shown in FIGS. 11 and 12, the second protective sub-cover 800 further includes a seventh through hole 803 and an eighth through hole 804. The seventh through hole 803 and the eighth through hole 804 are disposed on the second body 800A, so as to expose the third optical fiber connector 503 and the fourth optical fiber connector 504, which is conducive to the installation of the third optical fiber connector 503 and the fourth optical fiber connector 504. It will be noted that, for different numbers of the optical fiber connectors, the number of the seventh through hole 803 and the eighth through hole 804 included by the second protective sub-cover 800 is also different.

It will be noted that structures and functions of the third through hole 801, the fourth through hole 802, the seventh through hole 803, and the eighth through hole 804 are also applicable to the one-piece protective cover 900, and for the cooperation relationship between the plurality of through holes in the one-piece protective cover 900 and the second portion of the plurality of heat dissipation structures, reference may be made to the relevant description in the above description.

In some embodiments, as shown in FIGS. 11 and 12, the second protective sub-cover 800 further includes a first positioning portion 805 and a second positioning portion 806. The first positioning portion 805 and the second positioning portion 806 are disposed on two sides of the second body 800A, respectively, and are connected with the first protective sub-cover 700, so that the second protective sub-cover 800 may be positioned and fixed on the first protective sub-cover 700.

In some embodiments, the first positioning portion 805 and the second positioning portion 806 may be protrusions, and the protrusions protrude toward a direction away from the second body 800A. Of course, the first positioning portion 805 and the second positioning portion 806 may also be in other forms, and the present disclosure is not limited thereto.

Figure 13:
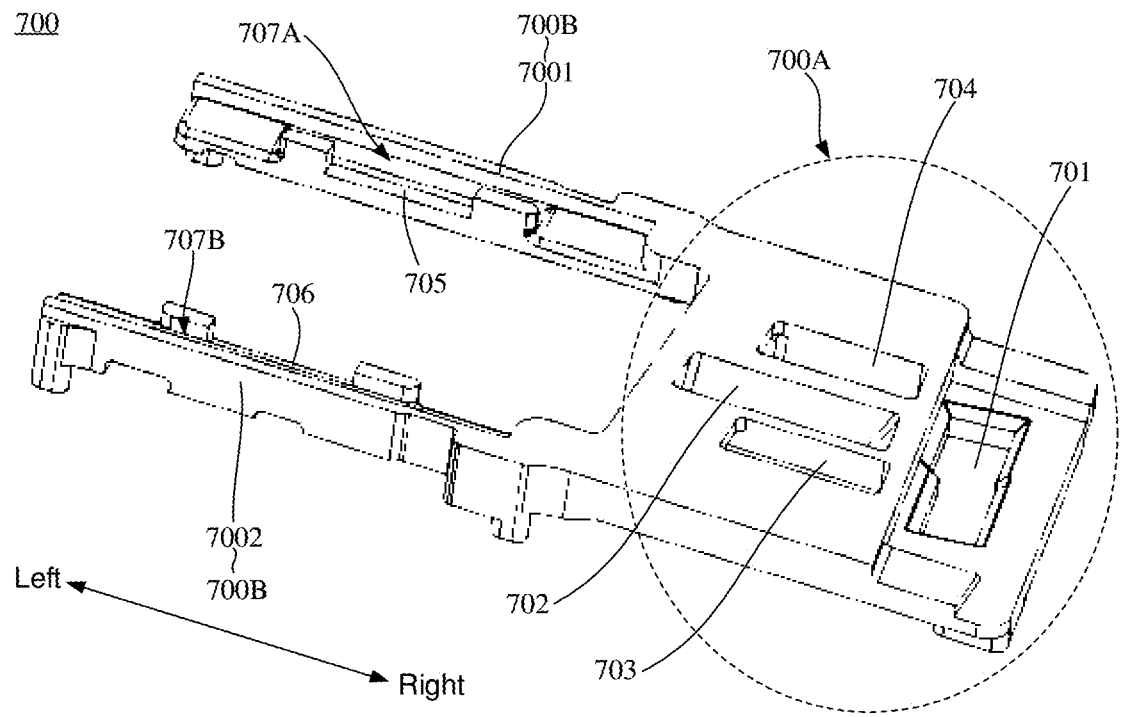
FIG. 13 is a diagram showing a structure of a first protective sub-cover, in accordance with some embodiments.
Figure 14:
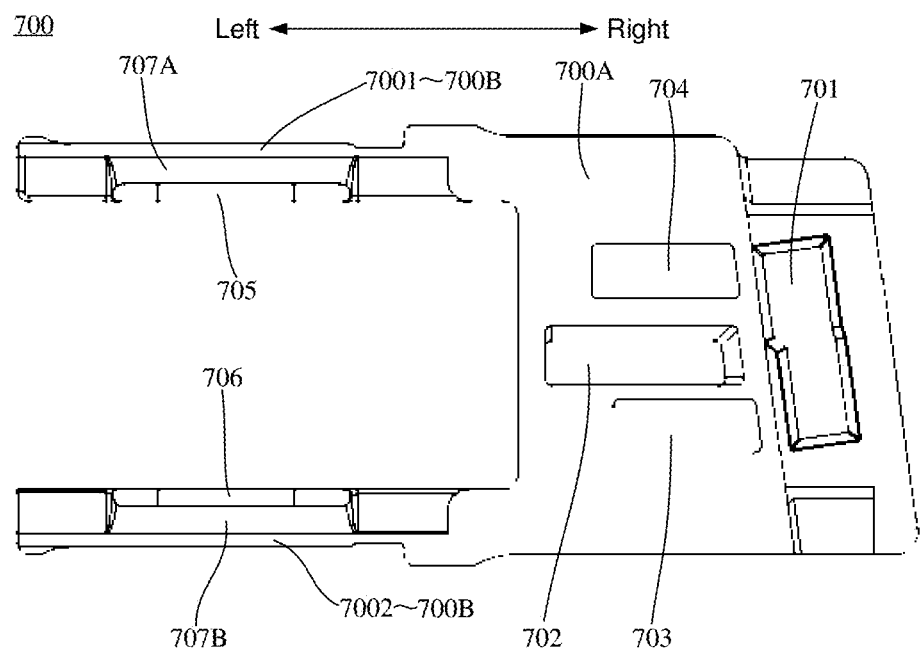
FIG. 14 is a top view of the first protective sub-cover in FIG. 13.

FIG. 13 is a diagram showing a structure of a first protective sub-cover, in accordance with some embodiments. FIG. 14 is a top view of the first protective sub-cover in FIG. 13.

In some embodiments, as shown in FIGS. 13 and 14, the first protective sub-cover 700 includes a first body 700A and two rods 700B (i.e., a first rod 7001 and a second rod 7002). For structures of the first body 700A and the two rods 700B, reference may be made to the relevant description in the above description, and details will not be repeated herein. The first protective sub-cover 700 further includes a plurality of through holes, and the plurality of through holes run through the first body 700A in the thickness direction of the first body 700A.

For example, the first protective sub-cover 700 includes a first through hole 701 and a second through hole 702. The first through hole 701 and the second through hole 702 are disposed on the first body 700A, so as to expose the first silicon optical chip 401 and the first laser assembly 402, thereby preventing the heat generated during the operation of the first silicon optical chip 401 and the first laser assembly 402 from accumulating in the first protective sub-cover 700.

Moreover, a first portion of the plurality of heat dissipation structures may pass through the first through hole 701 and the second through hole 702, so as to contact thermal conductive adhesive on the first silicon optical chip 401 and the first laser assembly 402, so that the heat generated during the operation of the first silicon optical chip 401 and the first laser assembly 402 may be dissipated by the shell 200A, thereby achieving the heat dissipation of the first silicon optical chip 401 and the first laser assembly 402.

In some embodiments, as shown in FIGS. 13 and 14, the first protective sub-cover 700 further includes a fifth through hole 703 and a sixth through hole 704. The fifth through hole 703 and the sixth through hole 704 are disposed in the first body 700A, so as to expose the first optical fiber connector 403 and the second optical fiber connector 404, which is conducive to the installation of the first optical fiber connector 403 and the second optical fiber connector 404. It will be noted that, for different numbers of the optical fiber connectors, the number of the fifth through hole 703 and the sixth through hole 704 included by the first protective sub-cover 700 is also different.

It will be noted that, structures and functions of the first through hole 701, the second through hole 702, the fifth through hole 703, and the sixth through hole 704 are also applicable to the one-piece protective cover 900, and for the cooperation relationship between the plurality of through holes in the one-piece protective cover 900 and the first portion of the plurality of heat dissipation structures, reference may be made to the relevant description in the above description.

In some embodiments, the second protective sub-cover 800 is disposed between the two rods 700B, and the second light transceiver component 500 is clamped between the two rods 700B.

In some embodiments, the first protective sub-cover 700 further includes a first mounting portion 705 and a second mounting portion 706. The first mounting portion 705 and the second mounting portion 706 are disposed on the surfaces of the two rods 700B proximate to each other respectively.

The first positioning portion 805 and the second positioning portion 806 are connected to the first mounting portion 705 and the second mounting portion 706, respectively. For example, the first positioning portion 805 and the second positioning portion 806 are clamped with the first mounting portion 705 and the second mounting portion 706, respectively, so as to achieve the assembly between the second protective sub-cover 800 and the first protective sub-cover 700.

In some embodiments, the first positioning portion 805 and the second positioning portion 806 include protrusions, in this case, as shown in FIGS. 13 and 14, the first mounting portion 705 and the second mounting portion 706 are grooves matched with the protrusions. The first mounting portion 705 and the second mounting portion 706 each are recessed in a direction away from the second light transceiver component 500. Moreover, sides (e.g., the upper sides) of the first mounting portion 705 and the second mounting portion 706 away from the circuit board 300 are open and the first positioning portion 805 and the second positioning portion 806 are clamped with the first mounting portion 705 and the second mounting portion 706, respectively.

Figure 15:
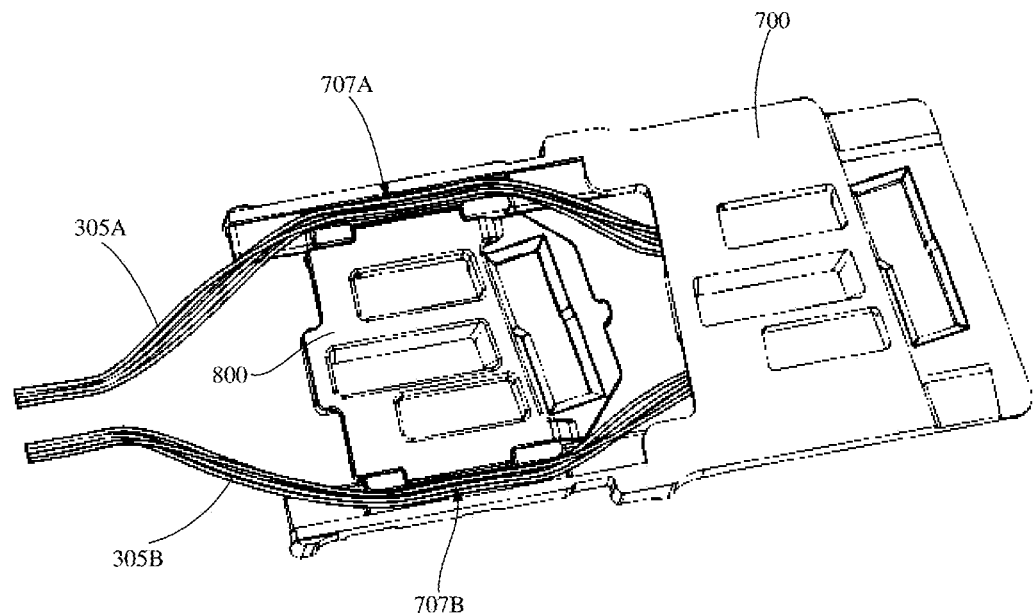
FIG. 15 is a diagram showing structures of a first optical fiber strip, a second optical fiber strip, and a protective cover, in accordance with some embodiments.

FIG. 15 is a diagram showing structures of a first optical fiber strip, a second optical fiber strip, and a protective cover, in accordance with some embodiments. FIG. 15 shows an assembly structure among the first optical fiber strip 305A, the second optical fiber strip 305B, and the protective cover 900.

In some embodiments, as shown in FIGS. 13 and 14, the first protective sub-cover 700 further includes two limiting structures (i.e., a first limiting structure 707A and a second limiting structure 707B). For structures and functions of the two limiting structures, reference may be made to the relevant description in the above description, and details will not be repeated herein. By providing the two limiting structures, as shown in FIG. 15, the first optical fiber strip 305A and the second optical fiber strip 305B pass through the first limiting structure 707A and the second limiting structure 707B on two sides of the second protective sub-cover 800 proximate to the two rods 700B, respectively.

In this case, as shown in FIG. 9, a hollow region 901 (e.g., the dotted line box in FIG. 9) is provided between the first protective sub-cover 700 and the second protective sub-cover 800. For a structure and a function of the hollow region 901, reference may be made to the relevant description in the above description, and details will not be repeated herein.

Figure 16:
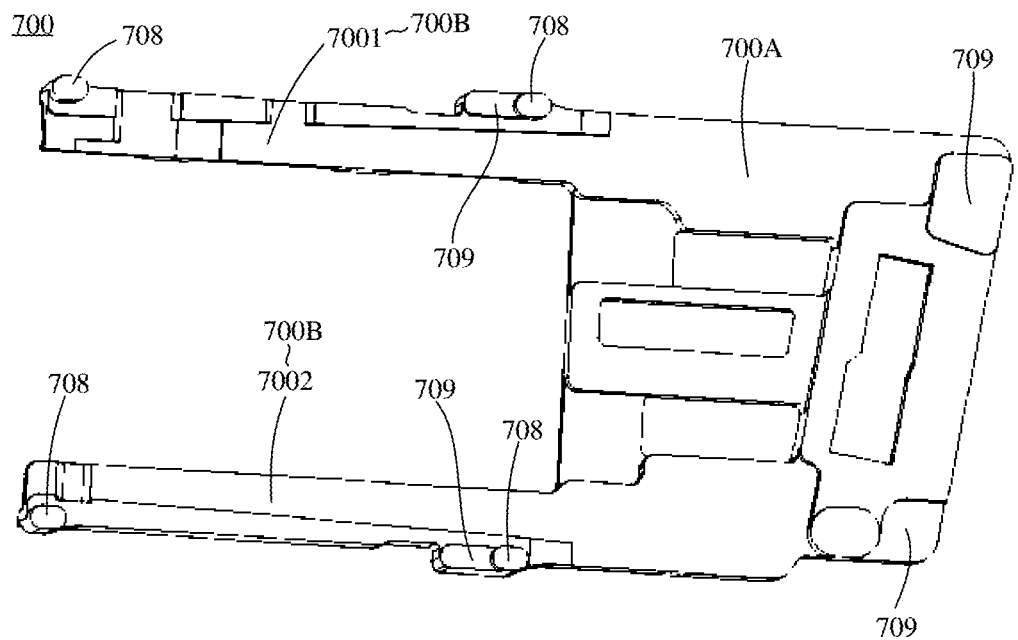
FIG. 16 is a diagram showing a structure of a first protective sub-cover from another perspective, in accordance with some embodiments.

FIG. 16 is a diagram showing a structure of a first protective sub-cover from another perspective, in accordance with some embodiments.

In some embodiments, as shown in FIG. 16, the first protective sub-cover 700 further includes one or more positioning posts 708. In a case where the first protective sub-cover 700 includes a plurality of positioning posts 708, the plurality of positioning posts 708 are disposed on sides of the two rods 700B proximate to the circuit board 300. For example, the first protective sub-cover 700 includes four positioning posts 708. Each rod 700B is provided with two positioning posts 708, and the two positioning posts 708 are located on the side of the corresponding rod 700B proximate to the circuit board 300. The two positioning posts 708 on the first rod 7001 are arranged symmetrically with the two positioning posts 708 on the second rod 7002. In this case, the circuit board 300 includes a plurality of positioning holes 304 (referring to FIG. 6), and the plurality of positioning posts 708 are connected to (e.g., clamped with) the plurality of positioning holes 304, respectively, so that the first protective sub-cover 700 may be fixed on the circuit board 300.

In some embodiments, as shown in FIG. 16, the first protective sub-cover 700 further includes a positioning surface 709. The positioning surface 709 is disposed on a side of the first body 700A proximate to the circuit board 300; alternatively, the positioning surface 709 is disposed on a side of at least one of the two rods 700B proximate to the circuit board 300; alternatively, the positioning surface 709 is disposed on sides of the first body 700A and the two rods 700B proximate to the circuit board 300. The positioning surface 709 abuts against the circuit board 300, so as to define an assembly state between the first protective sub-cover 700 and the circuit board 300 during the encapsulating process.

It will be noted that the positioning posts 708 and the positioning surface 709 may also be applied to the one-piece protective cover 900, and details will not be repeated herein.

An installation process of the first protective sub-cover 700 and the second protective sub-cover 800 of the optical module 200 will be described in detail below.

In the process of installing the first protective sub-cover 700 and the second protective sub-cover 800, after the circuit board 300 with optical assemblies has been installed, first, the first protective sub-cover 700 is covered the circuit board 300, the positioning posts 708 each are inserted into the corresponding positioning hole 304, and the first protective sub-cover 700 is pressed, so as to make the positioning surface 709 contact the circuit board 300. Then, glue is dispensed on the positioning posts 708, and the positioning posts 708 are fixed through the solidification of the glue, and the first optical fiber strip 305A and the second optical fiber strip 305B are placed into the first limiting structure 707A and the second limiting structure 707B, respectively. Afterwards, the second protective sub-cover 800 is installed, so that the first positioning portion 805 and the second positioning portion 806 are clamped into the first mounting portion 705 and the second mounting portion 706, respectively, and then glue is dispensed on the first positioning portion 805 and the second positioning portion 806, so as to fix the second protective sub-cover 800. Finally, the upper shell 201 is installed, and the first portion of the plurality of heat dissipation structures on the upper shell 201 passes through the first through hole 701 and the second through hole 702 and contacts the thermal conductive adhesive on the first silicon optical chip 401 and the first laser assembly 402, so as to achieve the heat dissipation of the first silicon optical chip 401 and the first laser assembly 402; and the second portion of the plurality of heat dissipation structures on the upper shell 201 passes through the third through hole 801 and the fourth through hole 802 and contacts the thermal conductive adhesive on the second silicon optical chip 501 and the second laser assembly 502, so as to achieve the heat dissipation of the second silicon optical chip 501 and the second laser assembly 502.

In some embodiments of the present disclosure, by providing the first protective sub-cover 700 and the second protective sub-cover 800 that are independent from each other on the limited space of the circuit board 300, it is possible to protect the wire bonding regions of the light transceiver components by using the first protective sub-cover 700 and the second protective sub-cover 800. Moreover, the assembly method between the first protective sub-cover 700 and the second protective sub-cover 800 is simple and convenient, and it is also possible to achieve the heat dissipation of the silicon optical chips and the laser assemblies through the first protective sub-cover 700 and the second protective sub-cover 800 and avoid affecting the normal work of the silicon optical chips and the laser assemblies. In addition, by providing the limiting structures, the optical fiber strips in the optical module 200 may pass through the first protective sub-cover 700 through the limiting structures, so as to limit the optical fiber strips while protecting the wire bonding regions.

A person skilled in the art will understand that the scope of disclosure in the present disclosure is not limited to specific embodiments discussed above and may modify and substitute some elements of the embodiments without departing from the spirits of this application. The scope of this application is limited by the appended claims.

What is claimed is:

1. An optical module, comprising:
a circuit board;
an internal optical fiber including a first optical fiber strip and a second optical fiber strip;
a first light transceiver component disposed on the circuit board and electrically connected to the circuit board;
a second light transceiver component disposed on the circuit board and electrically connected to the circuit board; and
a protective cover, the protective cover including:
a first protective sub-cover covering the first light transceiver component, the first protective sub-cover including:
a first body;
two rods disposed on an end of the first body proximate to the second light transceiver component and extending in a direction away from the first body, the two rods being arranged at an interval, and proximate to edges of two sides of the first body respectively; and
two limiting structures disposed on the two rods respectively, the two limiting structures being configured to limit the first optical fiber strip and the second optical fiber strip, the first optical fiber strip and the second optical fiber strip being connected to the first light transceiver component through the two limiting structures respectively; and
a second protective sub-cover covering the second light transceiver component and connected to the first protective sub-cover, the second protective sub-cover being located between the two rods.

2. The optical module according to claim 1, wherein the two rods include a first rod and a second rod, and the two limiting structures include:
a first limiting structure disposed on the first rod and located on a side of the second light transceiver component, the first optical fiber strip being connected to the first light transceiver component through the first limiting structure; and
a second limiting structure disposed on the second rod and located on another side of the second light transceiver component, the second optical fiber strip being connected to the first light transceiver component through the second limiting structure.

3. The optical module according to claim 1, wherein the second protective sub-cover is detachably connected to the first protective sub-cover.

4. The optical module according to claim 3, wherein the first protective sub-cover further includes:
a first mounting portion; and
a second mounting portion, the first mounting portion and the second mounting portion being disposed on the two rods and located on surfaces of the two rods that are proximate to each other, respectively;
the second protective sub-cover includes:
a second body;
a first positioning portion; and
a second positioning portion, the first positioning portion and the second positioning portion being disposed on two sides of the second body, respectively, and the first positioning portion and the second positioning portion being connected with the first mounting portion and the second mounting portion, respectively, so as to position and arrange the second protective sub-cover on the first protective sub-cover.

5. The optical module according to claim 4, wherein the first mounting portion and the second mounting portion are grooves, the first positioning portion and the second positioning portion are protrusions, and the protrusions are clamped with the grooves respectively.

6. The optical module according to claim 4, wherein one of the two limiting structures is located on a side of the first mounting portion away from the second protective sub-cover, and another limiting structure of the two limiting structures is located on a side of the second mounting portion away from the second protective sub-cover.

7. The optical module according to claim 1, wherein the first protective sub-cover and the second protective sub-cover are a one-piece member.

8. The optical module according to claim 1, wherein a hollow region is disposed between the first protective sub-cover and the second protective sub-cover, and the first optical fiber strip and the second optical fiber strip extend from a side of the second protective sub-cover away from the circuit board to a side of the first protective sub-cover proximate to the circuit board through the hollow region, so as to be connected with the first light transceiver component.

9. The optical module according to claim 8, wherein a portion of a side of the second protective sub-cover proximate to the first light transceiver component is an inclined surface, and the inclined surface is inclined in a direction away from the first light transceiver component, so as to avoid the first optical fiber strip and the second optical fiber strip through two sides of the second protective sub-cover.

10. The optical module according to claim 1, wherein the second light transceiver component is located between the two rods.

11. The optical module according to claim 1, wherein
   the first protective sub-cover is configured to cover a first wire bonding region between the first light transceiver component and the circuit board, so as to protect the first wire bonding region of the first light transceiver component; and
   the second protective sub-cover is configured to cover a second wire bonding region between the second light transceiver component and the circuit board, so as to protect the second wire bonding region of the second light transceiver component.

12. The optical module according to claim 1, wherein the internal optical fiber further includes a third optical fiber strip and a fourth optical fiber strip;
   the first light transceiver component includes:
      a first base;
      a first laser assembly disposed on the first base, the first laser assembly being configured to emit light;
      a first silicon optical chip disposed on the first base, the first silicon optical chip being configured to modulate the light emitted by the first laser assembly, so as to load information into the light, and receive and demodulate an optical signal from outside;
      a first optical fiber connector being optically coupled with the first silicon optical chip and connected to the second optical fiber strip; and
      a second optical fiber connector being optically coupled with the first silicon optical chip and connected to the first optical fiber strip;
   the second light transceiver component includes:
      a second base;
      a second laser assembly disposed on the second base, the second laser assembly being configured to emit light;
      a second silicon optical chip disposed on the second base, the second silicon optical chip being configured to modulate the light emitted by the second laser assembly, so as to load information into the light, and receive and demodulate another optical signal from the outside;
      a third optical fiber connector being optically coupled with the second silicon optical chip and connected to the fourth optical fiber strip; and
      a fourth optical fiber connector being optically coupled with the second silicon optical chip and connected to the third optical fiber strip.

13. The optical module according to claim 12, wherein
   the first protective sub-cover further includes a first through hole and a second through hole, the first through hole and the second through hole are disposed in the first body, so as to expose the first silicon optical chip and the first laser assembly; and
   the second protective sub-cover includes a second body, a third through hole and a fourth through hole, the third through hole and the fourth through hole are disposed in the second body, so as to expose the second silicon optical chip and the second laser assembly.

14. The optical module according to claim 13, further comprising a shell, wherein the shell includes:
   an upper shell, a side of the upper shell facing the circuit board being provided with a plurality of heat dissipation structures; and
   a lower shell, the upper shell covering the lower shell;
   wherein a first portion of the plurality of heat dissipation structures contacts the first silicon optical chip and the first laser assembly through the first through hole and the second through hole; and a second portion of the plurality of heat dissipation structures contacts the second silicon optical chip and the second laser assembly through the third through hole and the fourth through hole.

15. The optical module according to claim 13, wherein
   the first protective sub-cover further includes a fifth through hole and a sixth through hole, the fifth through hole and the sixth through hole are disposed in the first body, so as to expose the first optical fiber connector and the second optical fiber connector; and
   the second protective sub-cover further includes a seventh through hole and an eighth through hole, the seventh through hole and the eighth through hole are disposed in the second body, so as to expose the third optical fiber connector and the fourth optical fiber connector.

16. The optical module according to claim 12, wherein a light-exit surface of the first laser assembly proximate to the first silicon optical chip is constructed as an inclined surface, and the inclined surface is inclined relative to a plane perpendicular to an axial direction of the first laser assembly, and a surface of the first silicon optical chip proximate to the first laser assembly is parallel to the light-exit surface of the first laser assembly.

17. The optical module according to claim 1, further comprising a first opening and a second opening, wherein the first opening and the second opening run through the circuit board in a thickness direction of the circuit board, the first light transceiver component is disposed in the first opening, and the second light transceiver component is disposed in the second opening.

18. The optical module according to claim 1, wherein the two limiting structures each are grooves, and the grooves each are located on a side of the corresponding rod away from the circuit board and recessed towards the circuit board, and the first optical fiber strip and the second optical fiber strip each are disposed in the corresponding groove.

19. The optical module according to claim 1, wherein the circuit board includes at least one positioning hole, and the first protective sub-cover further includes at least one positioning post, and the positioning post is disposed on a side of at least one of the two rods proximate to the circuit board, and the positioning hole is matched with the positioning post, so that the first protective sub-cover is fixedly connected to the circuit board.

20. The optical module according to claim 1, wherein the first protective sub-cover further includes a positioning surface, and the positioning surface abuts against the circuit board and satisfies at least one of the following:
   the positioning surface is disposed on a side of the first body proximate to the circuit board; or the positioning surface is disposed on at least one of the two rods proximate to the circuit board.

* * * * *